United States Patent Office 3,285,063
Patented Nov. 15, 1966

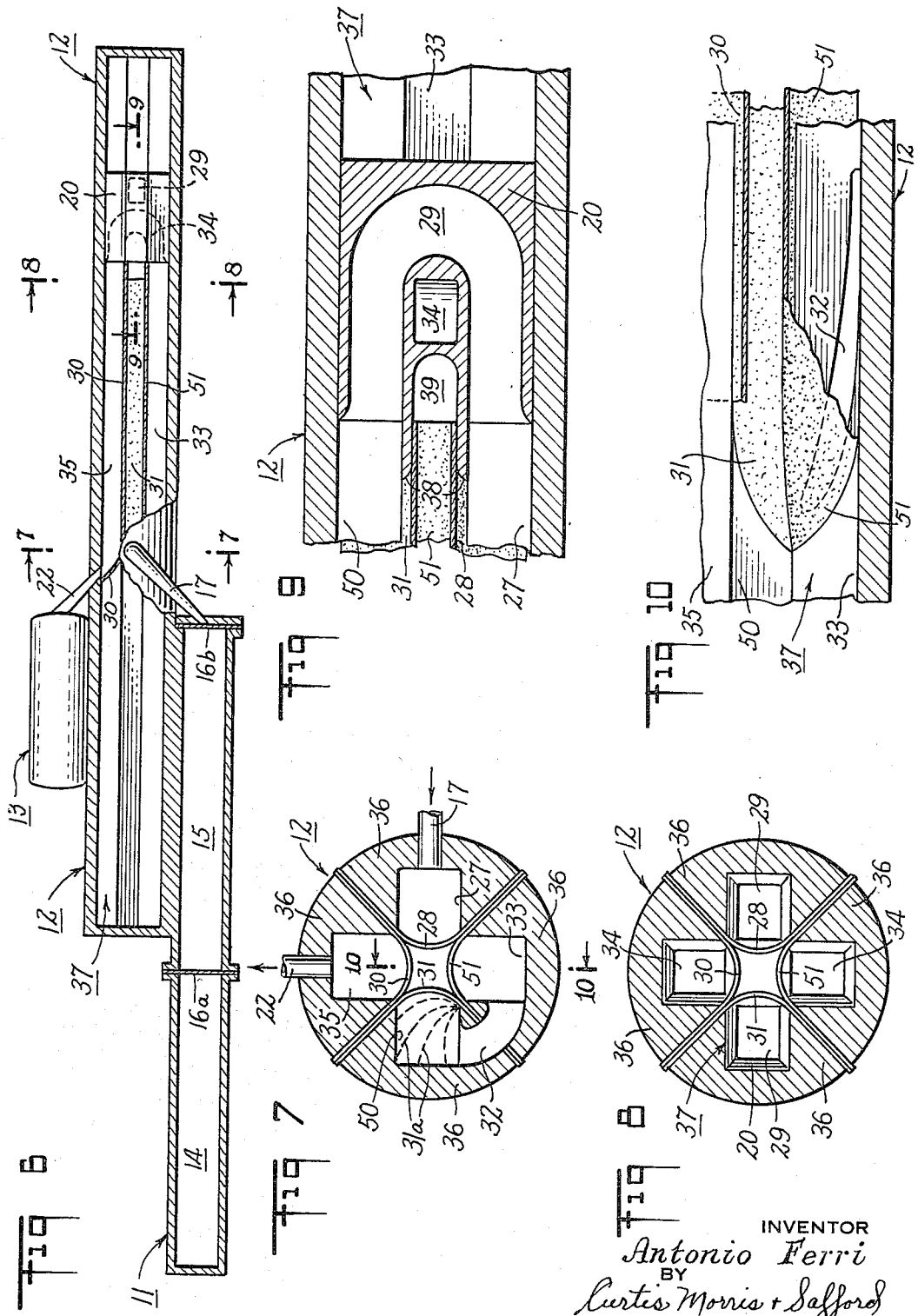

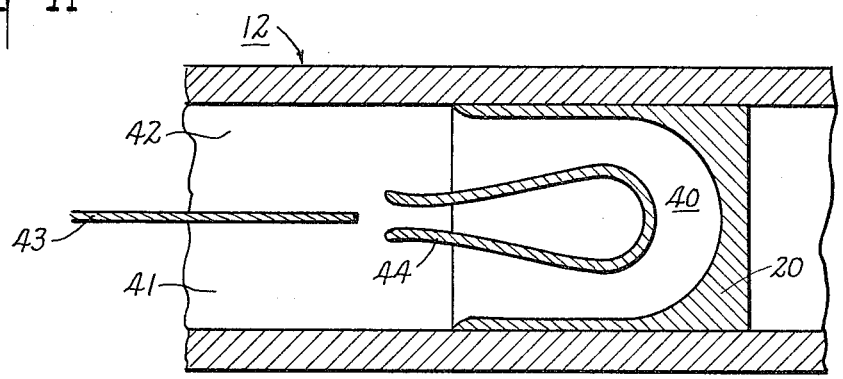
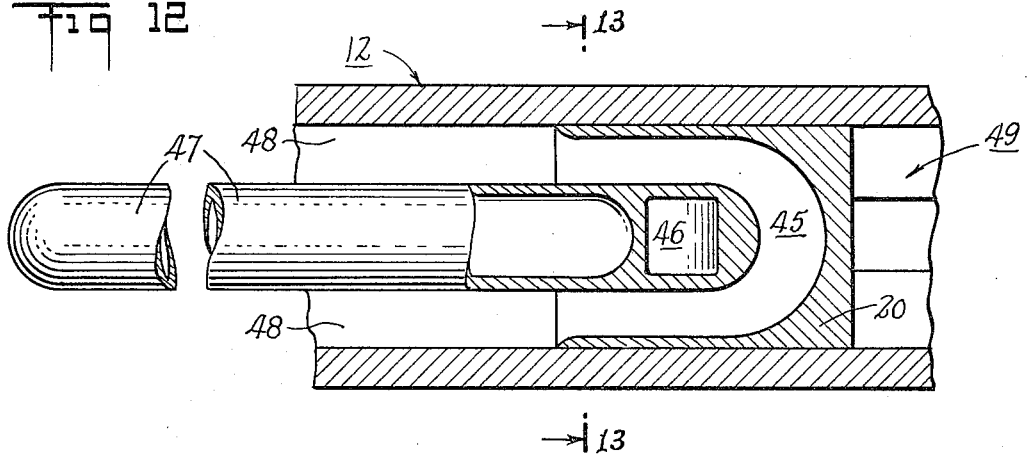
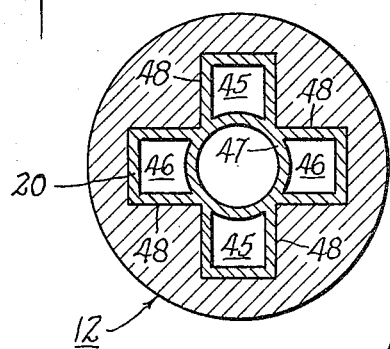

3,285,063
GAS ACCELERATING SYSTEM
Antonio Ferri, Rockville Centre, N.Y., assignor to General Applied Science Laboratories, Inc., Westbury, N.Y., a corporation of New York
Filed June 10, 1964, Ser. No. 373,924
17 Claims. (Cl. 73—147)

This invention relates to systems for the acceleration of gas to high velocities.

As the capability of engines for the propulsion of aircraft and missiles increases, it becomes increasingly more difficult to ground test the engines and their components under conditions duplicating those which will prevail in actual flight at supersonic velocities. For example, present shock tunnel facilities for testing supersonic engines and engine components can generate velocities in the range of Mach numbers between 8 and 15. However, stagnation pressures and enthalpies are only duplicated in such tunnels to about Mach number 12.

The present invention relates to a gas accelerating system adaptable to use in facilities for testing aircraft engines and missiles at conditions duplicating full scale for Mach numbers of the order of 20 to 25 at altitudes of the order of 100,000 feet. A facility of this type will have testing times of the order of 10 milliseconds.

The gas accelerator systems of the present invention, when employed with suitable initial sources of high energy air, can be used to accelerate that air to duplicate stagnation pressures of the order of one million atmospheres and stagnation enthalpies of the order of 12,000 B.t.u. per pound, corresponding with Mach numbers of 20–25 and flight altitudes of the order of 100,000 feet.

These systems function by adding kinetic energy to high velocity air by an exchange of momentum between the air and a moving piston. High velocity air, as generated in a shock tube for example, is introduced into the gas accelerating system of the present invention at a low static pressure, for example of the order of one atmosphere. By acceleration of this air with a moving piston, the kinetic energy and total pressure of the air are increased in a manner related to the piston velocity and number of piston stages. After acceleration, the accelerated air is suitably expanded isentropically into a test nozzle to duplicate the desired test section static conditions.

Kinematically, the acceleration of gas according to the present invention may be illustrated by considering the introduction of a gas stream flowing with an absolute velocity V into a piston moving with an absolute velocity U in a direction opposed to the air flow. The piston is equipped with a flow duct changing by 180° the direction of a stream of air introduced into an arm of the flow duct. In such an arrangement, the velocity of the air stream relative to the piston on entering the flow duct is $(V+U)$. Under ideal conditions, the relative velocity of the air leaving the piston after a 180° change in direction is equal to its relative velocity when entering the piston, and the absolute velocity of the air leaving the piston will be $[(V+U)+U]$, or $(V+2U)$. By repassage of the accelerated air a second time through the piston to effect another 180° reversal, the absolute velocity of the air can be raised to a value of $(V+4U)$. Still further passages of the accelerated gas through a moving piston with a change in flow direction will effect further acceleration in a like manner.

Thus, for example, in a gas accelerating system according to the present invention in which a flow of high velocity gas is reversed in direction on each of two passages through a moving piston, a final air velocity of the order of 22,000 feet per second at an equivalent pressure altitude of 120,000 feet can be obtained by acceleration of air initially having a velocity of 10,000 feet per second, after expansion from an initial stagnation pressure of 2000 atmospheres, in a piston travelling at a velocity of 3000 feet per second. By boosting piston velocity to 4000 feet per second, a final air velocity of 26,000 feet per second at the above-mentioned equivalent pressure altitude can be approached using the same source of air of high initial velocity. Air velocities of a magnitude of 10,000 feet per second are now obtainable in the art employing known shock tube means.

A better understanding of the present invention can be had by referring to the accompanying drawings, in which:

FIG. 6 is a front view, partially in section, of a preferred embodiment of a gas accelerating system showing the various components thereof in greater detail;

FIG. 7 is a side sectional view taken along line 7—7 of FIG. 6 and showing in greater detail interior portions of a gas accelerator tube in the system of FIG. 6;

FIG. 8 is a side sectional view taken along line 8—8 of FIG. 6 showing in greater detail the construction of a piston within the gas accelerator tube of the system of FIG. 6;

FIG. 9 is a plan sectional view taken along line 9—9 of FIG. 6 showing additional structural details of the piston of FIGS. 6 and 8;

FIG. 10 is a front sectional view taken along line 10—10 of FIG. 7 showing details of a gas direction-reversal port;

FIG. 11 is a plan sectional view showing portions of another arrangement of a gas accelerator cylinder and piston;

FIG. 12 is a plan sectional view of portions of still another piston and cylinder arrangement; and FIG. 13 is a side sectional view taken along line 13—13 of FIG. 12 showing details of construction of the piston and cylinder arrangement of FIG. 12.

FIGS. 1–5 show the operation of a gas accelerating system according to the present invention by schematic representation of such a system at five successively later instants of time.

Figure 1:
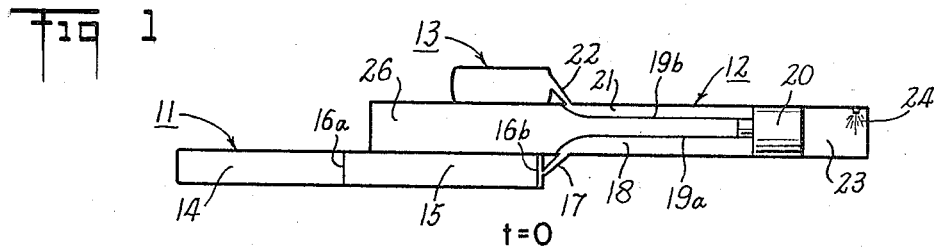
FIGS. 1–5 are a schematic representation of a gas accelerating system according to the present invention, shown in section and illustrating the principle and operation of the invention.

FIG. 1 shows a gas accelerating system including a source of high velocity gas such as shock tube arrangement 11, gas accelerator tube 12 for accelerating the high velocity gas, and means, such as test chamber 13, for receiving accelerated gas leaving accelerator tube 12. Shock tube arrangement 11, which is a conventional means for generating a shock wave, comprises first chamber 14, or shock tube driver chamber 14, containing a combustible gas mixture. Second chamber 15, containing gas to be driven in production of a shock wave, is defined between destructible membranes 16a and 16b. On rupture of membrane 16b, second chamber 15 is in communication with gas accelerator tube 12 through nozzle means 17, which furnish an entry port to tube 12 and serve further to expand and accelerate gas leaving chamber 15. Specifically, chamber 15 is in communication with first gas passage 18 in gas accelerator tube 12. Gas passage 18 is defined in tube 12 by a wall of said tube and destructible membrane 19a, and is in communication through movable piston 20 with second gas passage 21, also defined by a wall of tube 12 and destructible membrane 19b. Piston 20 comprises conduit means (not shown in FIGS. 1–5) for conducting gas from first gas passage 18 to second gas passage 21 with a change in gas direction through an angle of 180°. Second gas passage 21 is in communication with test chamber 13 through exit port nozzle means 22. Tube 12 comprises means for accelerating movable piston 20, such as combustion chamber 23 for containing controlled explosions generating compressed gases which expand to move piston 20 leftwardly through tube 12. At time $t=0$ shown in FIG. 1, with passages 18 and 21 and entry and exit ports 17 and 22 evacuated, controlled explosion 24 is generated in chamber 23.

Figure 2:
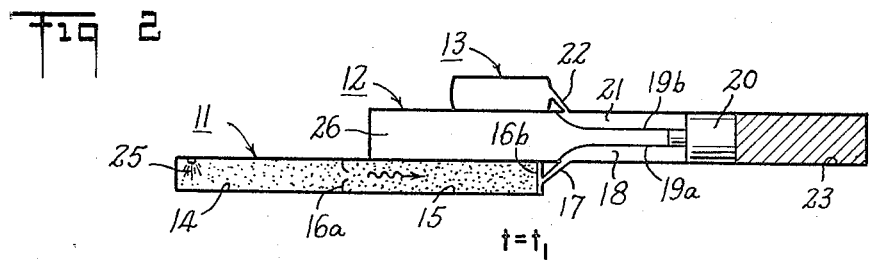

FIG. 2 shows the system at later time $t=t_1$. Piston 20 is accelerating leftwardly through tube 12 under the influence of expanding explosion gases in chamber 23. In chamber 14 of shock wave tube 11, detonation 25 has caused rupture of membrane 16a, with generation in chamber 15 of a shock wave, indicated by the arrow. At time $t=t_1$, the shock wave generated in tube 15 has not yet ruptured membrane 16b and entered first gas passage 18 through entry port 17.

Figure 3:
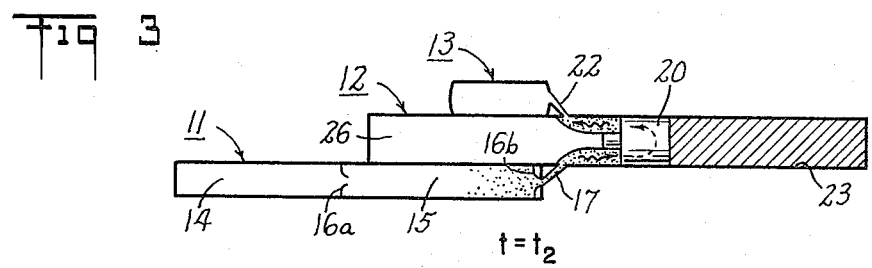

At later time $t=t_2$, shown in FIG. 3, the shock wave has ruptured membrane 16b, has reached entry port 17, and has entered into first gas passage 18 in gas accelerator tube 12. At time $t=t_2$, movable piston 20 has attained a very high and substantially constant velocity in its leftward movement down gas accelerator tube 12, partially obliterating gas passages 18 and 21 in its travel by destroying membranes 19a and 19b in its path. Gas flows through intact portions of passage 18, is reversed in direction in movable piston 20 and led into passage 21, and then passes from passage 21 through exit port 22 into test chamber 13, provided with suitable known measuring and testing devices.

Figure 4:
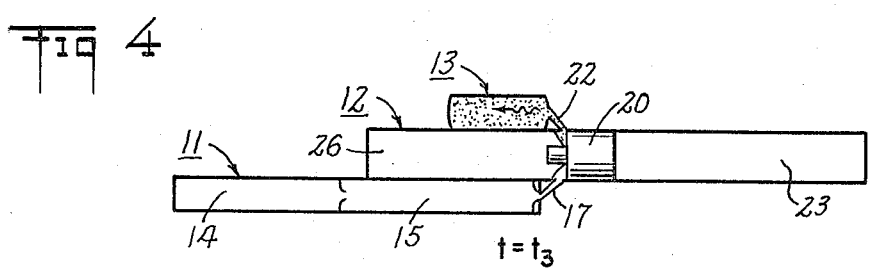

At later time $t=t_3$ shown in FIG. 4, movable piston 20 has moved leftwardly down gas accelerator tube 12 to a point where entry port 17 and exit port 22 are about to be blocked off by the passage of piston 20. At time $t=t_3$, the shock wave, just shown entering entry port 17 in FIG. 3, has proceeded through that port and through first passage 18, as has been reversed in direction in movable piston 20, has passed down second gas passage 21 with increased velocity, has discharged through exit port 22 into test chamber 13, and there is creating heretofore unattainable supersonic gas flow conditions suitable for testing purposes.

Figure 5:
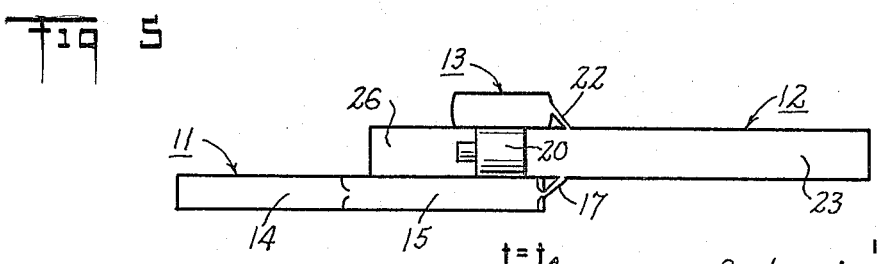

FIG. 5 shows the condition of the system at later time $t=t_4$, after completion of the generation of supersonic test conditions in chamber 13. At this time, the shock wave generated by the shock tube arrangement 11 has been fully expended. Movable piston 20 has passed the level of entry and exit ports 17 and 22 respectively, and has entered deceleration chamber 26 of gas accelerator tube 12. Deceleration of the piston in chamber 26 is suitably effected by the compression of gases originally contained within chamber 12 exteriorly of gas passages 18 and 21, or by gases introduced into chamber 26 at a time after piston 20 has reached its maximum velocity and has performed its function of reversing the direction of travel of the shock wave moving therethrough.

For purposes of clarity, the embodiments schematically shown in FIGS. 1–5 have been simplified to facilitate ready understanding of the invention. In particular, in FIGS. 1–5, the passage of a shock wave through first gas passage 18, moving piston 20, and then in a reverse direction through second gas passage 21, results only in a single reversal of direction of the gas in moving piston 20. Since the gas is accelerated on each reversal of direction in the moving piston, still higher gas velocities can be obtained in systems which pass the gas more than once through the moving piston.

FIG. 6 is a front view, partly in section, showing a more complicated system operating on the same principles as the embodiment of FIGS. 1–5, but causing a plurality of reversals of direction of gas flow in a moving piston. FIG. 6 shows a source of high velocity gas such as shock tube arrangement 11 comprising first chamber 14 and second chamber 15 defined by rupturable membranes 16a and 16b. The system includes gas accelerator tube 12. Means for receiving accelerated air from tube 12, such as test chamber 13, are provided. Entry port 17 and exit port 22 serve in FIG. 6 as in FIGS. 1–5. As in the FIGS. 1–5, accelerator tube 12 is equipped with piston accelerating means such as chamber 23 wherein the expansion of compressed gases initiates leftward movement of movable piston 20. However, the destructible membrane arrangement of the system of FIG. 6 is more complicated than that in FIGS. 1–5, since it is relied upon to define, not two, but four, gas passages which will conduct the compressed gases of a shock wave generated in shock tube arrangement 11 along gas accelerator tube 12, not twice, but four times. Similarly, although movable piston 20 of FIGS. 1–5 requires only conduit means for effecting a single 180° reversal of gas direction therein, piston 20 of FIG. 6 comprises a plurality of gas passages, conduits, or apertures for effecting several direction reversals.

A better understanding of the operation of the system of FIG. 6 will be had by referring simultaneously to FIG. 7, which is a side sectional view taken along line 7—7 of FIG. 6. As will be seen from referring to FIGS. 6 and 7, which is a side sectional view taken along line 7—7 of isentropic expansion of the shock tube processed gas to a static pressure of the order of one atmosphere, communicates with gas accelerator tube 12 at one side thereof, specifically communicating with first gas passage 27 defined by a wall of the cavity of cylinder or tube 12 and by destructible membrane 28, suitably made of metal foil or a plastic such as "Mylar." In view of the joinder of one end of membrane 28 to a wall of gas accelerator tube 12 in the vicinity of entry and exit ports 17 and 22 (as shown for membrane 30 in FIG. 6), gas entering first gas passage 27 from port 17 moves rightwardly in FIG. 6. On entering movable piston 20, the gas is reversed in direction by flowing through first reversing passage 29 of piston 20 of FIG. 6. As shown in FIG. 6, this first reversal in direction of the gas causes the bending of a stream of gas, moving to the right in FIG. 6, down into the plane of FIG. 6, and then back parallel to the plane of the figure in a lefthand moving direction. After passage of the gas through piston 20, the gas will be contained within second passage 50 (FIG. 7), will be reversed in direction, and will be increased in velocity due to the acceleration experienced on reversal in moving piston 20. This second gas passage 50 is similarly formed by a portion of the wall of tube 12 and destructible membrane 31.

On reaching that portion of gas accelerator tube 12 indicated by line 7—7 in FIG. 6, the gas contained in second gas passage 50 is again reversed in direction in reversal passage 32 of FIG. 7, hereinafter explained in greater detail. The gas then enters third gas passage 33 shown in FIGS. 6 and 7, flows again through piston 20, has its direction reversed once more through 180° in second piston reversal passage 34, and then enters fourth gas passage 35. From passage 35, the accelerated gas enters test chamber 13 through exit port 22 shown in FIGS. 6 and 7. Third and fourth gas passages 33 and 35 are defined by the walls of gas accelerator tube 12 and by rupturable membranes 51 and 30, respectively, as will be evident from FIG. 7.

Those skilled in the art will appreciate that pressure losses in the gas will be experienced in practice by the turning of a supersonic gas flow for direction reversal as just described. However, even with overall pressure recoveries of the order of 0.5 in each of three successive turns, the final performance of the system is still very high, as indicated earlier herein.

FIGS. 8 and 9 of the drawings show the construction and operation of movable piston 20 of FIG. 6 and the manner in which it is fitted in tube 12. FIG. 8 is a side sectional view taken along line 8—8 of FIG. 6 and shows the walls of gas accelerator tube 12 and a plurality of destructible membranes 28, 30, 31, and 51. As indicated in FIG. 8, a convenient construction for tube 12 comprises a plurality of fitted segments 36, between which membranes 28, 30, 31, and 51 can be removably mounted.

Each segment 36 is machined to comprise a substantially rectangular cavity therein, so that, on assembly, cruciform cylinder cavity generally indicated by reference numeral 37 is formed. Fitted within this cylinder cavity 37, which need not have the specific shape or dimensions shown in the figure, is matching piston 20 having first and second piston reversal passages 29 and 34 therein.

Simultaneous reference to FIG. 6 and FIG. 9, which latter is a plan view in section taken along line 9—9 of FIG. 6, will clarify the construction of piston 20. From these figures, it will be clear that two U-shaped passages respectively aligned at right angles are contained within piston 20. First piston reversing passage 29 of FIG. 6 is shown clearly as U-shaped passage 29 of FIG. 9. Conversely, the U-shaped second reversal passage 34 of FIG. 6 appears in section in FIG. 9. The reversal effected in the direction of gas entering piston 20 through first gas passage 27 and leaving piston 20 through second gas passage 50 will be clear from the figure. Piston 20 of FIG. 9 may be equipped with cutting knives 38 in anterior portions thereof to aid in the destruction of membranes 28 and 31 during leftward movement of piston 20 through gas accelerator tube 12 of FIG. 9. If desired, piston 20 may be equipped with means 39 for collecting the destroyed membranes, though the mass of the membrane contained within accelerator tube 12 is in any event so slight as not to interfere with the proper operation of the gas accelerator device.

While it is believed that FIGS. 6–9 make clear the operation and function of movable piston 20 in reversing the direction of flow of a stream of gas moving therethrough, whereby the gas is accelerated, the "two-pass" device shown in FIG. 6 also requires that the direction of the gas be reversed at least once in the device outside of piston 20. This reversal of the direction of the gas outside piston 20 effects no increase in the velocity of the gas, but merely reverses the direction of the gas to permit a second passage of the gas through moving piston 20.

A better understanding of one means by which the gas can be reversed in direction outside the piston will be had by again referring to FIG. 7 and to FIG. 10, which latter is a partial sectional view taken along line 10—10 of FIG. 7. As indicated for the membrane 30 of FIG. 6, membranes 28 and 31 of FIG. 7 are joined at one end thereof to the wall of gas accelerator tube 12 in order to define passages open only in the direction of piston 20 of FIG. 6. However, just as membrane 30 of FIG. 6 will conduct gas from fourth gas passage 35 into exit port 22 and test chamber 13, and just as membrane 28 of FIG. 7 conducts gas from entry port 17 down to moving piston 20, membrane 31 of FIG. 7 is joined to the wall of accelerator gas tube 12 in a manner to conduct gas from gas passage 50 into reversal passage 32, formed in the walls of gas accelerator tube 12. The successive cross-sections of membrane 31 as it constricts and reduces the effective volume of second gas passage 50 within tube 12 are shown as dotted lines 31a of FIG. 7. FIG. 10 also shows membrane 31 joined to wall portions of accelerator tube 12 in second gas passage 50, whereby gas is forced through gas reversal passage 32, and exits therefrom into third gas passage 33.

FIG. 11 refers to another, much simpler, embodiment of the present invention in which only a single gas reversal is effected. FIG. 11 shows gas accelerator tube 12 having movable piston 20 therein, said piston comprising single piston reversing aperture 40 for reversing the direction of flow of gas entering first gas passage 41 by diversion into second gas passage 42. The gas passages are separated by destructible membrane 43, and are respectively in communication with a source of flow of high velocity gas to be accelerated in said system and means for receiving accelerated gas from said system. Piston 20 suitably comprises means 44 for destroying and collecting said membrane, and is accelerated leftward in cylinder 12 by means such as an expanding gas to the right of piston 20 in FIG. 11.

FIGS. 12 and 13 show a preferred piston and cylinder arrangement in which the need for destructible membranes extending the length of the cylinder is obviated. FIG. 12 is a plan view in section showing gas accelerator tube 12 containing movable piston 20 equipped with first and second gas reversal passages 45 and 46. Piston 20 is also equipped with elongated projection or tongue portion 47 extending along the length of gas accelerator tube 12 and defining plural gas passages 48 within said tube.

FIG. 13 is a side sectional view taken along line 13—13 of FIG. 12 showing gas accelerator tube 12, piston member 20 fitted therein, and gas passages 48 defined within tube 12 by the walls of the cylinder cavity and by elongated projection 47 of piston 20. It will be clear that the piston arrangement shown in FIGS. 12 and 13 can be employed in a device such as is shown in FIG. 6. The arrangement of destructible membranes present in FIG. 6 may be modified to eliminate membranes except those in the vicinity of entry and exit ports 17 and 22 respectively, and those near reversing passage 32 (cf. FIG. 10). Along the length of gas accelerator tube 12, elongated projection 47 of the piston itself serves to inhibit gas flow from one of passages 48 to another of said passage 48. Controlled reversal in moving piston 20 or at reversal passage 32, for example, is effected as in FIGS. 6 and 10.

Projection 47 of piston 20 of FIGS. 12 and 13 is suitably hollow to facilitate its acceleration to high velocities, of the order of 3000 feet per second. An initial acceleration of the piston of 6000g's, attained by the use of high pressure gas to drive the piston for example, will produce the desired piston velocities after the piston has travelled about 40 feet. Piston 20, including projection 47, may be constructed of fiberglass or other materials which will withstand these accelerations. Projection 47, if hollow, may be internally pressurized by the same gas used to drive piston 20, so that all portions of the piston and projection are more uniformly subjected to accelerating forces. Ducts (not shown in FIGS. 12 and 13) communicating through the walls of piston 20 between the hollow interior of projection 47 and cylinder volume 49 to the right of piston 20 in FIG. 12 will permit a flow of compressed gases driving piston 20 to reach the interior of projection 47, for example, equalizing accelerating forces applied to front and rear portions of the piston assembly.

Although specific embodiments have been shown and described herein, it will be understood that they are exemplary, and are not to be construed as limiting on the scope and spirit of the invention.

What is claimed is:

1. A system for the acceleration of a flow of high velocity gas, said system including a cylinder; partition means in said cylinder defining a plurality of gas channels therein, including a first gas channel in communication with a source of flow of high velocity gas, and a second gas channel in communication with means adapted to receive an accelerated flow of gas from said system; movable piston means in said cylinder, said first and second gas channels being in communication through said movable piston; and means for accelerating said movable piston in a direction opposite the direction of flow of high velocity gas in said first gas channel.

2. A system as in claim 1 wherein said partition means include membrane means arranged within said cylinder.

3. A system as in claim 1 wherein said partition means include a member extending from said movable piston into said cylinder.

4. A system as in claim 1 wherein said plurality of gas channels defined within said cylinder by said partition means include a third and fourth gas channel, said first and third gas channels and said fourth and second gas channels respectively being in direct communication through said movable piston, and said third and fourth gas channels being in direct communication outside said piston, whereby a gas flow path between said source of high velocity gas and said receiving means is defined by said first, third, fourth, and second gas channels consecutively, said path passing twice through said movable piston.

5. A system as in claim 1 wherein said means for accelerating said movable piston include a source of compressed gas for driving said piston.

6. A system as in claim 1 including a source of flow of high velocity gas.

7. A system for the acceleration of a flow of high velocity gas, said system including a cylinder and a piston therefor, said piston having an elongated projecting member extending into said cylinder to define, together with interior walls of said cylinder, a plurality of gas channels in said cylinder, said piston further having at least one aperture therein through which at least a first and a second of said gas channels are in communication, said first and second gas channels also being in communication respectively with a source of flow of high velocity gas and means for receiving an accelerated flow of gas from said system; and means for accelerating said piston in said cylinder in a direction opposite the direction of flow of high velocity gas in said first gas channel.

8. A system as in claim 7 wherein said first and second gas channels are in direct communication through said piston aperture.

9. A system as in claim 7 wherein said first and second gas channels are in indirect communication through said piston aperture by way of a gas flow path including at least one further gas channel in said cylinder.

10. A system as in claim 7 wherein interior walls of said cylinder define a cruciform cavity and said walls and said elongated projecting member of said piston in turn define four gas channels within said cylinder.

11. A system as in claim 7 including shock tube means in communication with said first gas channel as a source of flow of high velocity gas.

12. A system for the acceleration of a flow of high velocity gas, said system including a cylinder; a piston therefor; membranous partition means defining, together with interior walls of said cylinder, a plurality of gas channels in said cylinder, said piston having at least one aperture therein through which at least a first and second of said gas channels are in communication, said first and second gas channels also being in communication respectively with a source of flow of high velocity gas and means for receiving an accelerated flow of gas from said system; and means for accelerating said piston in said cylinder in a direction opposite the direction of flow of high velocity gas in said first gas channel.

13. A system in claim 12 wherein said first and second gas channels are in direct communication through said piston aperture.

14. A system as in claim 12 wherein said first and second gas channels are in indirect communication through said piston aperture by way of a gas flow path including at least one further gas channel in said cylinder.

15. A system as in claim 12 wherein interior walls of said cylinder define a cruciform cavity and said walls and said membrane means in turn define four gas channels within said cylinder.

16. A system as in claim 12 including shock tube means in communication with said first gas channel as a source of flow of high velocity gas.

17. A system for the acceleration of a flow of high velocity gas, said system including a plural assembly of longitudinal gas channels aligned in generally parallel arrangement and including a first gas channel in communication with a source of flow of high velocity gas and a second gas channel in communication with means for receiving a flow of accelerating gas leaving said system; conduit means at a first end of said assembly of gas passages pairwise connecting each channel other than said first and second channels with one other channel; movable conduit means at a second end of said assembly of gas channels further pairwise connecting each gas channel including said first and second channels with one other channel to form a single continuous gas flow path between said source and said receiving means, said movable conduit means being adapted to move linearly along the lengh of said longitudinal channels between said second end of said assembly and said first end; and means for accelerating said movable conduit means in a direction opposite the direction of flow of high velocity gas in said first gas channel.

References Cited by the Examiner
UNITED STATES PATENTS

| 2,925,803 | 2/1960 | Ottestad. | |
| 2,931,218 | 4/1960 | Ottestad | 73—12 |

DAVID SCHONBERG, Primary Examiner.